United States Patent [19]

Horsch

[11] Patent Number: 4,643,285

[45] Date of Patent: Feb. 17, 1987

[54] HYDRAULIC CONTROL FOR A MASTER CLUTCH OF A TRANSMISSION

[75] Inventor: Joachim Horsch, Lombard, Ill.

[73] Assignee: J.I. Case Company, Racine, Wis.

[21] Appl. No.: 691,602

[22] Filed: Jan. 14, 1985

[51] Int. Cl.⁴ ............................................. F16D 25/11
[52] U.S. Cl. ................................ 192/87.13; 192/87.18; 192/3.58
[58] Field of Search ................. 192/87.1, 87.13, 87.14, 192/87.18, 87.19, 3.58

[56] References Cited

U.S. PATENT DOCUMENTS

| | | | |
|---|---|---|---|
| 3,468,194 | 9/1969 | Horsch et al. | 74/753 |
| 3,780,762 | 12/1973 | Matthews et al. | 192/87.19 X |
| 3,938,637 | 2/1976 | Murakami | 192/87.19 X |
| 4,354,584 | 10/1982 | Reifinger et al. | 192/3.57 |
| 4,498,356 | 2/1985 | Vater et al. | 74/745 |

Primary Examiner—Rodney H. Bonck
Assistant Examiner—Richard M. Lorence
Attorney, Agent, or Firm—Cullen, Sloman, Cantor, Grauer, Scott & Rutherford

[57] ABSTRACT

The present invention provides a control system for the master clutch of a powershift type transmission of a motor vehicle. The inventive control system provides a manually controlled, fluid activated clutch with a high pedal force requirement with initial engagement, and a low pedal force requirement for operating the clutch in the inching mode. The inventive clutch control utilizes the hydraulic fluid pressure activating the master clutch to help the operator actuate the clutch pedal. The inventive master clutch control system also allows for smooth engagement of the master clutch when the clutch pedal is suddenly released.

1 Claim, 2 Drawing Figures

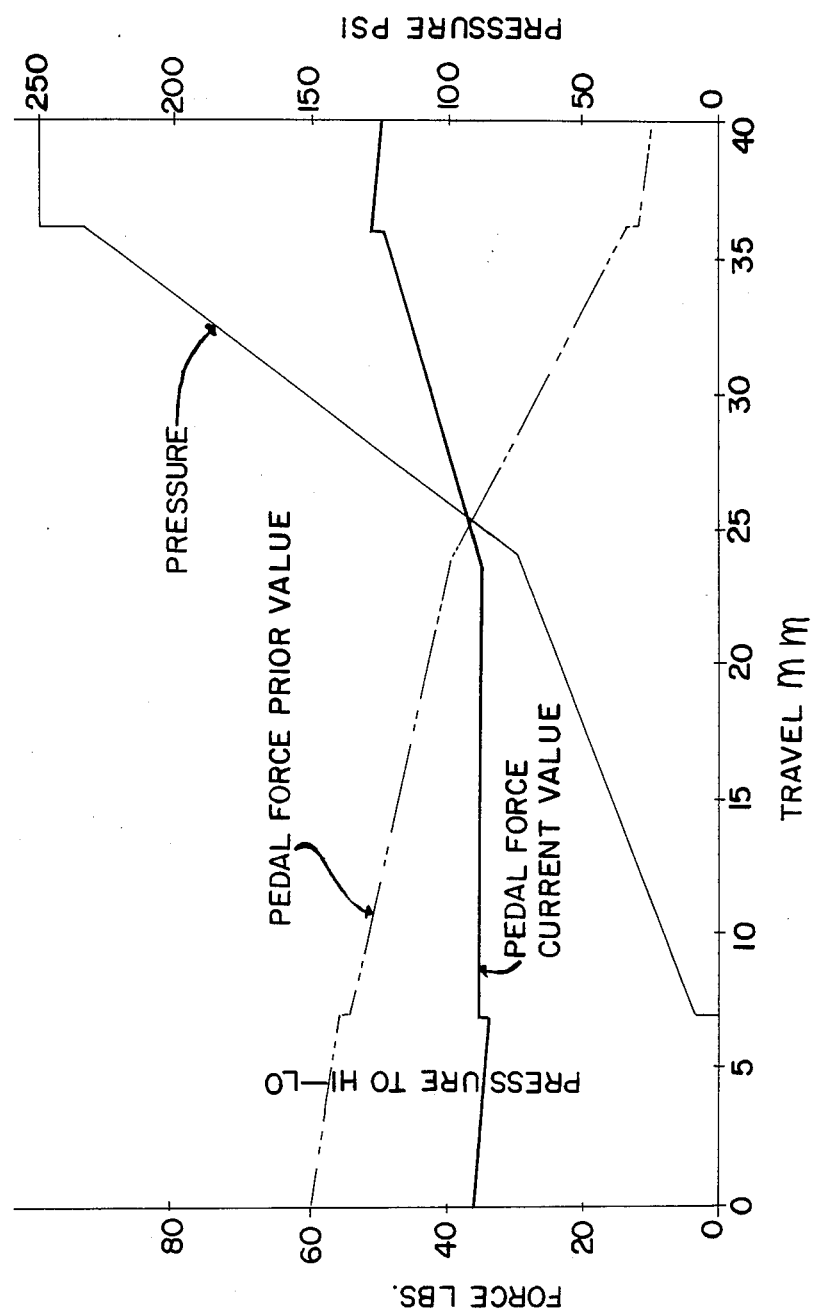

HYDRAULIC CONTROL FOR A MASTER CLUTCH OF A TRANSMISSION

BACKGROUND OF THE INVENTION

The present invention relates generally to a control system for a fluid activated clutch and more particularly to a master clutch in a power shift type transmission. An example of such a power shift type transmission is shown and described in co-pending U.S. patent application Vater et al., Ser. No. 379,549, filed May 18, 1982, now U.S. Pat. No. 4,498,356.

Vehicle transmissions, specially power shift transmissions, usually have one main fluid activated clutch which is operated manually by the operator. The present invention provides a control system which improves the operating characteristics of the master clutch.

DISCLOSURE STATEMENT

The pedal force requirement for the master clutch should meet two competing requirements. To allow easy control of the clutch when in the inching mode of machine operation, it was desirable to have a low pedal force requirement. However, when initially disengaging the clutch, a high pedal force is desirable to prevent the clutch being activated by the operator resting his foot on the clutch pedal. Prior to the present invention, the pedal force requirement was usually resolved as a compromise between the two desired features. To provide a clutch control valve providing high initial pedal force requirement and a low pedal force requirement in the inching mode, the present invention is brought forth.

SUMMARY OF THE INVENTION

The present invention provides a spool valve slidingly mounted within a bore which is divided into at least first and second pressure chambers. The second pressure chamber intersects with the clutch supply line outlet. Biasing means are provided in the first chamber urging the spool towards the second chamber. The inventive valve also provides for means of fluid communication between the clutch outlet and the first chamber allowing the pressure of the clutch to aid the operator in the operation of the clutch pedal. Using the clutch pressure in operating the clutch pedal, allows a high initial pedal force requirement, and a low pedal force requirement in the inching mode.

It is the object of the present invention to provide a master clutch control system that provides for high initial pedal effort and a low pedal effort in the inching control range. It is another object of the present invention to provide a master clutch control system that provides for gradual clutch engagement when the clutch pedal is suddenly released.

Other objects and advantages of the present invention will become more apparent to those skilled in the art as the nature of the invention is better understood in the accompanying drawings and a detailed description.

BRIEF DESCRIPTION OF THE DRAWINGS

FIG. 2 is a graph illustrating the relationship between pedal force and master clutch pressure.

DETAILED DESCRIPTION OF THE DRAWINGS HIGH-LOW POWERSHIFT CONTROL

Figure 1:
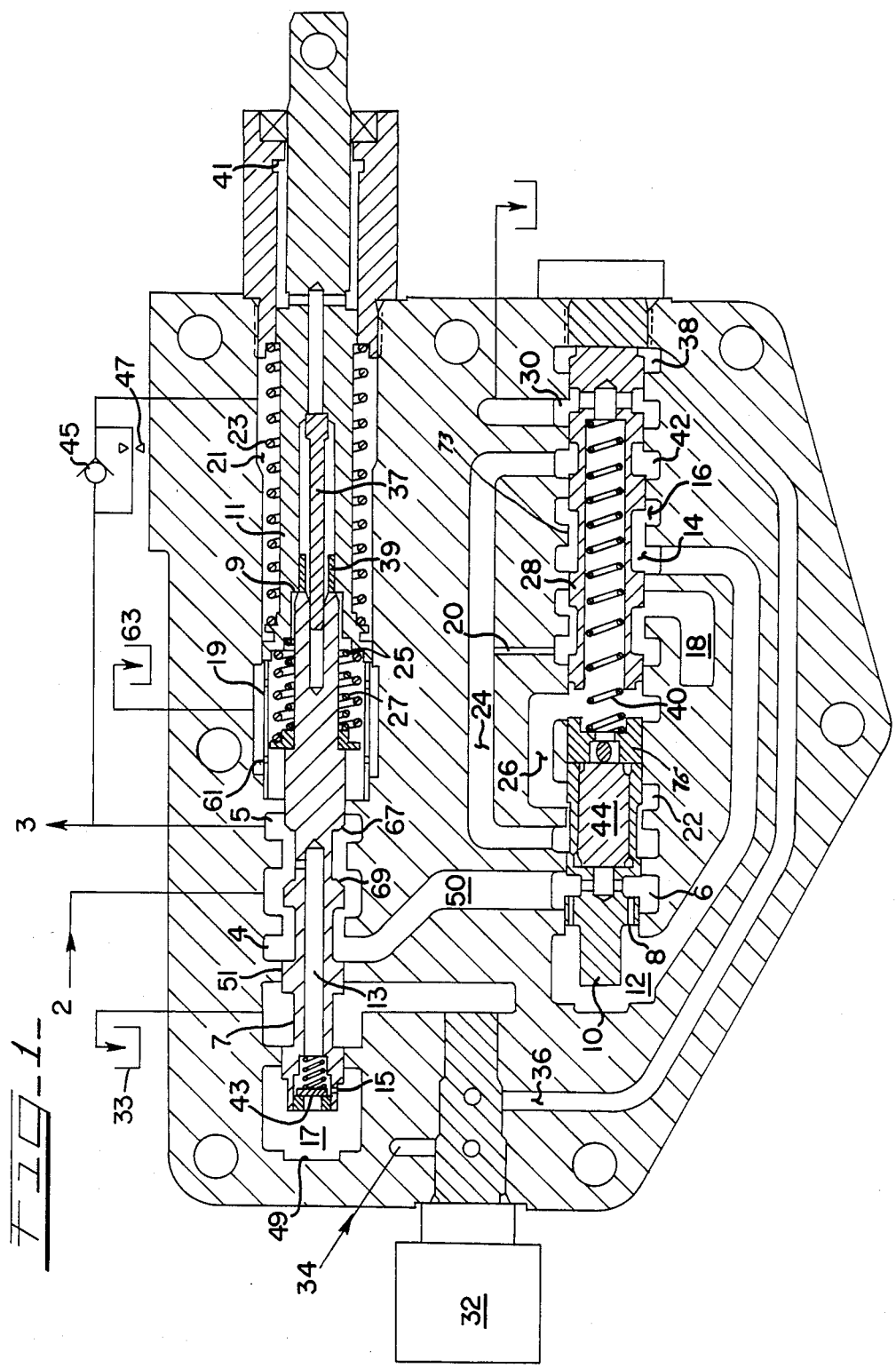
FIG. 1 is a top sectional view of the control system of the present invention.

In the position shown, pressurized fluid (hydraulic oil) is directed from source 2 in through port 4, through port 6 (via port 50), through orifice 8 in spool (or drainage valve) 10, through port 12, through port 14 to the High clutch piston (not shown) connected by port 16. The Low clutch piston (not shown) connected to passage 18 is drained through passages 20 and 24, through port 22, through passage 26, through the holes in spool 28, to drain port 30. When a shift is made by actuating the solenoid 32, pressure fluid is directed from port 34 through passage 36 (36 was connected to drain by solenoid 32 prior to shift) to port 38, forcing the spool 28 (which is slideably mounted within the bore 73) toward the left against the force of spring 40. Spring 40 at its left end is held by divider 75 which divides bore 73 into separate but communicating chambers. The movement of (selector) spool 28 will connect the Low clutch passage port 18 to port 14 and the High clutch port to drainage port 42. As oil flows from 2 through orifice 8 a pressure drop occurs in port 12 causing spool 10 to shift leftward due to the force caused by reaction pin 44. Now drainage port 42 is cut off from drain and connected to source 2, (via passage 50) thus the High clutch port 16 is still pressurized while the Low clutch port 18 is being filled. As soon as the flow to the Low clutch stops, the pressure rises in port 12, shifting the spool 10 rightward, connecting the High clutch to drain and of course simultaneously the Low clutch is now pressurized.

Shifting from Low to High the solenoid 32 connects the port 36 to drain causing the spool 28 to move rightward and triggering the same sequence of events described above.

MASTER CLUTCH CONTROL

In the position shown the master clutch 3 is pressurized from 2 to port 5. The spool 7 is held against surface 9 of spool 11 by pressure directed through internal passage 13 in spool 7 through damping orifice 15 in spool 7 to chamber 17. The spool 11 is held against stop 19 by pressure in the annular spring cavity 21, in addition the force of spring 23.

As spool 11 is pulled rightward by actuating the clutch pedal, the spool 7 will follow the rightward motion until the metering slots 69 and 67 are positioned between 2 on one side and drain 63 on the other side causing the pressure in port 5 to drop until a force equilibrium is established beteween the pressure force in port 17 and the force of springs 25 and 27. (Stop 19 has holes 61 to allow the chambers surrounding springs 27 and 25 to communicate with drain 63). At this point of motion the contact at surface 9 is eliminated. Further rightward motion of spool 11 will decrease the force of spring 25 and 27 reducing the clutch pressure further. At approximately mid-point of the rightward movement the spring 27 reaches its free length and the force of 25 only is acting on spool 11. Further motion of spool 11 will continue to decrease the clutch pressure but at a lower rate. Spool members 7 and 11 have a lost motion type connection. Eventually the headed pin 37 (pressed into spool 7) will contact the bushing 39, and further rightward movement of spool 11 will also pull spool 7 rightward. This will drop the pressure to the master clutch to zero and also will cut off pressure from port 4 and connect it (4) to drain 33. Thus, the pressure to the powershift (sometimes referred to auxiliary) clutches High or Low is dropped to zero. The spool 11 will finally contact the surface 41 at the extreme right position.

When the clutch pedal is released the spool 11 will move leftward urged by the force of spring 23. If the leftward movement is sudden, the check valve 43 opens allowing oil to flow out of cavity 17 at a high rate rather than being restricted by orifice 15. (This orifice 15 is required for damping purposes in the metering position.) Thus, spool 11 can move rapidly to the metering position allowing for a good response.

When the clutch pedal is actuated rapidly pulling spool 11 rapidly rightward, oil is displaced from cavity 21 through check valve 45 at a rapid rate. Thus, the clutch can be disengaged rapidly. When the clutch pedal is released rapidly oil flow is restricted through orifice 47 into cavity 21. Thus, the clutch pedal will return at a slow rate providing for a gradual engagement of the clutch. The combination of check valve 45 and fluid resistor 47 mounted in parallel provides unidirectional fluid resistance in the line connecting the clutch outlet and the first chamber (spring chamber 21).

When the tractor is shut down the fluid pressure from source 2 is zero. That allows the spool 7 to move leftward against surface 49 urged by springs 25 and 27. On start up the pressure cannot build up in chamber 17 since it is connected to drain 33 in this position. Thus, pressure cannot get to any of the clutches. The clutch pedal will have to be depressed to mechanically pull the spool 7 rightward to disconnect port 17 from drain. Then after the pedal is released pressure can build up in port 17 and thus in the clutches. Therefore the engine can be started in any gear, but the tractor will not move until the clutch pedal is depressed and released.

The above arrangement of the spool and spring that allows for a clutch control spool without a reduced area reaction pin as utilized on the clutch control valve of the previous tractors. Yet the present inventive clutch control valve provides for low pedal efforts within the limited pedal travel. This is done by using the clutch pressure to "help" the operator in actuating the pedal. (A large reaction area on the spool causes larger forces on the spool making it less sensitive to frictional forces. Thus, a more precise clutch control is effected.) The clutch pressure acting on the actuating stem or spool 11 allows a reduced force spring 23. If the clutch pressure were not used, the force of spring 23 would have to be large enough to hold spool 11 to stop 19 against the source 2 pressure times the area of spool 7. As the spool 11 is pulled rightward, the spring force would continue to increase causing a high pedal effort. With the use of the clutch pressures, the spring force, plus the pressure force equals the force on spool 7. Now, as the spool 11 is moved rightward, the pressure force drops as the spring force rises to provide a much reduced net pedal effort. FIG. 2 illustrates the pedal force versus travel force relationship of a prior master clutch control valve and the master clutch control valve of the present invention.

The clutch control valve provides for a high initial pedal effort with a low pedal effort in the "inching" control range. This will eliminate the tendency for the clutch to be partially engaged when the operator rests his foot on the clutch pedal. It will also tend to be less sensitive to binding linkage due to dirt and rust which may not allow the pedal to return to the fully engaged position. Of course clutch failure can be the result if the clutch is not allowed to fully engage.

Again, using the clutch pressure to act on the actuating stem 11 provides a high force when the clutch pressure is high and reduced force when it is low.

The arrangement of check valve 45 and fluid resistor 47 provides for a gradual clutch engagement when the pedal is suddenly released by restricting the oil flow to the actuating spool 11 in one direction only. The arrangement of landing 51 or spool 7 drops the High-Low clutch pressure by preventing flow through passage 50 when the clutch pedal is completely depressed.

While a few of the embodiments of the present invention have been explained, there will be readily apparent to those skilled in the art of the various modifications which can be made to the present invention without departing from the spirit and scope of this application as it is accomplished by the following claims.

What is claimed is:

1. A manually activated valve for a fluid activated master clutch of a transmission comprising:
    a valve body having a bore, a fluid inlet and a clutch outlet intersecting with said bore;
    a valve spool slidably mounted within said bore for selectively allowing fluid communication between said fluid inlet and clutch outlet, said valve spool dividing said bore into first, second, and third fluid chambers wherein said clutch outlet intersects said second chamber;
    biasing means urging said valve spool towards said second chamber;
    means for permitting fluid communication between said clutch outlet and said first chamber, said means for permitting fluid communication including a unidirectional fluid resistive element, and said unidirectional fluid resistive element comprising first and second fluid lines connected in parallel wherein said first fluid line having a check valve preventing flow to said first chamber and said second fluid line having a fluid resistive element allowing flow through the fluid resistive element to said first chamber;
    said valve spool comprising a first spool member mounted within said first chamber and a second spool member mounted within said second chamber, a spring biasing means interposed between said first and second spool members, said spring biasing means including first and second springs, said first and second springs having different free lengths, and said first spring being concentrically positioned within said second spring;
    said third fluid chamber located at the opposite end of said bore from said chamber and said valve having means for permitting fluid communication between said fluid inlet and said third chamber, said means for permitting fluid communication between said inlet and said third chamber comprising an internal passage within said valve spool, and said valve spool internal passage further comprising an orifice allowing fluid communication between said fluid inlet and said third chamber and a check valve allowing reverse flow through said internal passage towards said fluid inlet;
    said valve body including a drain line intersecting said bore, and said drain line intersecting said bore between said clutch outlet and said first chamber;
    a lost motion connection between said first and second spool members, said lost motion connection including a pin fixably attached to one of said valve spool members and inserted into the other of said valve spool members for allowing limited relative motion between said valve spool members; and
an auxiliary clutch outlet intersecting said bore wherein movement of said second valve spool member selectively connecting said fluid inlet with said auxiliary clutch outlet.

* * * * *